United States Patent
Lee et al.

(10) Patent No.: US 10,509,429 B2
(45) Date of Patent: Dec. 17, 2019

(54) METHOD AND APPARATUS FOR IMPROVING EFFICIENCY OF A CLOUD PLATFORM BASED ON NODE USAGE

(71) Applicant: UNIVERSITY-INDUSTRY COOPERATION FOUNDATION OF KYUNG HEE UNIVERSITY, Yongin-si (KR)

(72) Inventors: Sung Young Lee, Seongnam-si (KR); Muhammad Bilal Amin, Yongin-si (KR)

(73) Assignee: University—Industry Cooperation Foundation Of Kyung Hee University, Yongin-si (KR)

( * ) Notice: Subject to any disclaimer, the term of this patent is extended or adjusted under 35 U.S.C. 154(b) by 634 days.

(21) Appl. No.: 14/851,870

(22) Filed: Sep. 11, 2015

(65) Prior Publication Data
US 2016/0077539 A1    Mar. 17, 2016

(30) Foreign Application Priority Data
Sep. 11, 2014 (KR) .................. 10-2014-0120472

(51) Int. Cl.
G05F 1/66   (2006.01)
G05B 15/02  (2006.01)

(52) U.S. Cl.
CPC ............... *G05F 1/66* (2013.01); *G05B 15/02* (2013.01)

(58) Field of Classification Search
CPC .. G06F 3/04842; G06F 9/50; G06F 17/30607; G05F 1/66
USPC ........................................... 700/291
See application file for complete search history.

(56) References Cited

U.S. PATENT DOCUMENTS

| | | | |
|---|---|---|---|
| 8,386,482 B2* | 2/2013 | Gopalakrishnan | G06F 17/30867 707/732 |
| 9,641,964 B2* | 5/2017 | Kulkarni | H01Q 1/24 |
| 9,729,675 B2* | 8/2017 | Luecke | H04L 67/327 |
| 9,841,494 B2* | 12/2017 | Meadow | G01S 5/10 |
| 10,057,723 B2* | 8/2018 | Kulkarni | H01Q 1/24 |
| 10,346,756 B2* | 7/2019 | Kirk | H04L 67/22 |
| 2003/0058277 A1* | 3/2003 | Bowman-Amuah | G06F 17/30607 715/765 |

(Continued)

FOREIGN PATENT DOCUMENTS

| KR | 10-1266421 B1 | 5/2013 |
|---|---|---|
| KR | 10-1433030 B1 | 8/2014 |

OTHER PUBLICATIONS

S. Choi, et al., "Energy-aware Model based on User Behavior in Cloud Computing Environment," Department of Multimedia Science, Sookmyung Women's University, vol. 39, No. 2 (D), 2012, pp. 226-227 (1 page in English, 3 pages in Korean).

(Continued)

*Primary Examiner* — Gene N Auduong
(74) *Attorney, Agent, or Firm* — NSIP Law (57) ABSTRACT

A profiling-based energy-aware recommendation method for a cloud platform at a cloud mediator interface may include: collecting usage data of a cloud node over predetermined intervals of time; generating and storing an energy usage profile for each node by using the collected usage data; acquiring real-time usage data from the cloud node; and comparing the real-time usage data with the generated energy usage profile so as to calculate a recommendation value.

19 Claims, 5 Drawing Sheets

(56) References Cited

U.S. PATENT DOCUMENTS

| | | | |
|---|---|---|---|
| 2011/0298301 A1* | 12/2011 | Wong | H04L 12/2827 |
| | | | 307/116 |
| 2012/0060142 A1* | 3/2012 | Fliess | G06F 8/70 |
| | | | 717/102 |
| 2013/0254196 A1* | 9/2013 | Babu | G06F 17/30595 |
| | | | 707/736 |
| 2014/0337733 A1* | 11/2014 | Rodriguez | G06F 3/04842 |
| | | | 715/718 |
| 2015/0273929 A1* | 10/2015 | Bridges | B42D 15/042 |
| | | | 206/215 |
| 2016/0044035 A1* | 2/2016 | Huang | H04L 63/0272 |
| | | | 726/4 |
| 2018/0330293 A1* | 11/2018 | Kulkarni | G06Q 10/0633 |

OTHER PUBLICATIONS

J-Y, Jung, et al., "Green Power Management System for Server Power Saving at Data Center," Electronics and Telecommunications Research Institute, Vo. 39, No. 1(A), 2012, pp. 253-255 (1 page in English, 3 pages in Korean).

* cited by examiner

METHOD AND APPARATUS FOR IMPROVING EFFICIENCY OF A CLOUD PLATFORM BASED ON NODE USAGE

CROSS-REFERENCE TO RELATED APPLICATION(S)

This application claims the benefit under 35 U.S.C. § 119(a) of Korean Patent Application No. 10-2014-0120472, filed on Sep. 11, 2014, in the Korean Intellectual Property Office, the entire disclosure of which is incorporated herein by reference for all purposes.

BACKGROUND

1. Field

The following description relates to energy-aware cloud and clustering computing technologies in distribution environments, and particularly to profiling-based energy-aware recommendation apparatus and method.

2. Description of the Related Art

Cloud systems are recently popular due to the predominance of computing platforms. Such cloud systems are enlarged more than a service and an arrangement model, which are initially proposed. Thus, for adopting such cloud systems, the road map of cloud computing faces the challenges to overcome. The challenges to overcome indicate availability, performance, and scalability, which directly affect the platform energy.

Cloud computing requires a plurality of product machines to provide resources to clients without the time when the product machines do not operate and its performance degradation. A price setting model based on the utility is very cost-effective from the point of clients. However, from the point of cloud service providers, a big amount of the energy should be consumed so that infrastructures can support the availability and performance. In other words, such cloud platforms are made largely based on the large-scale facilities, i.e., clusters and data centers, resulting in the huge energy emissions. In 2006, the large-scale IT infrastructures in U.S. consumed 61 billion kWh of electricity, which costed 4.5 billion dollars. Also, it is estimated that in 2011, 7.4 billion dollars of energy was consumed, which almost doubled the energy consumption in 2006.

In addition, the data centers that consume such a large-scale energy affect badly on the environment because of the huge carbon emissions, resulting in the conclusions of various treaties, such as the Green Grid, the Green Computing Impact Organization (GCIO), and the Green Electronics Council. IT infrastructure development companies e.g., DELL, HP, Intel, AMD, IBM, and Lenovo are active members complying with such treaties. The purposes of such treaties are to propose techniques and technologies, which can contribute to reducing the energy costs of the IT infrastructure e.g., desktops in small-scale to data centers in large-scale. In conclusion, energy-effective schemes and techniques are applied to the manufacture of infrastructures and become the essential point in sales based on the IT infrastructures.

However, the energy consumption of the large-scale infrastructures is the result that is caused not from the use of physical infrastructures but from provisioning methods of such physical infrastructures. In such infrastructures, the use of sources and operation of applications play a major role in the energy consumption of the data centers. Thus, the scope of the energy efficiency varies from a macro level, e.g., data center, to a micro level, e.g., CPU utilization.

Among them, CPU is the most power hungry component among electronic elements installed in submachines that belongs to the micro level. However, the innovative technologies in microprocessor technologies, such as dynamic voltage and frequency scaling (DVFS) are recently developed to improve such CPU power efficiency. Particularly, multi-core processors are mainstreamed, where each core is used as a virtual CPU in a virtual machine.

However, such a platform does not focus on large-scale data and clusters because of the effects of cloud computing. The small organizations and laboratories that share the infrastructures are hosted to private clouds. Furthermore, unlike data centers and clusters, cloud platforms are also being hosted over heterogeneous environment where some machines are servers and some are desktops so as to provide a cloud platform. In addition, there has been the study using the micro structure with a low-cost cloud platform. However, even for the small-scale cloud platform that is low-cost and energy-efficient, if the provisioning is not performed appropriately, it would be inefficient in terms of the energy consumption.

SUMMARY

For an ideal energy efficient cloud platform, provided is a profiling-based energy-aware recommendation apparatus and method to enable virtual machines to reduce the possibilities of idle systems and to be provisioned to reduce the possibilities of idle systems.

In one general aspect, a profiling-based energy-aware recommendation method for a cloud platform at a cloud mediator interface includes: collecting usage data of a cloud node over predetermined intervals of time; generating and storing an energy usage profile for each node by using the collected usage data; acquiring real-time usage data from the cloud node; and comparing the real-time usage data with the generated energy usage profile so as to calculate a recommendation value.

In another general aspect, a profiling-based energy-aware recommendation apparatus for a cloud platform includes: a profiler to collect usage data of a cloud node over predetermined intervals of time and generate and store an energy usage profile for each node by using the collected usage data; a real-time usage feedback receiver to acquire real-time usage data from the cloud node; and a recommendation engine to compare the real-time usage data with the generated energy usage profile so as to calculate a recommendation value.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
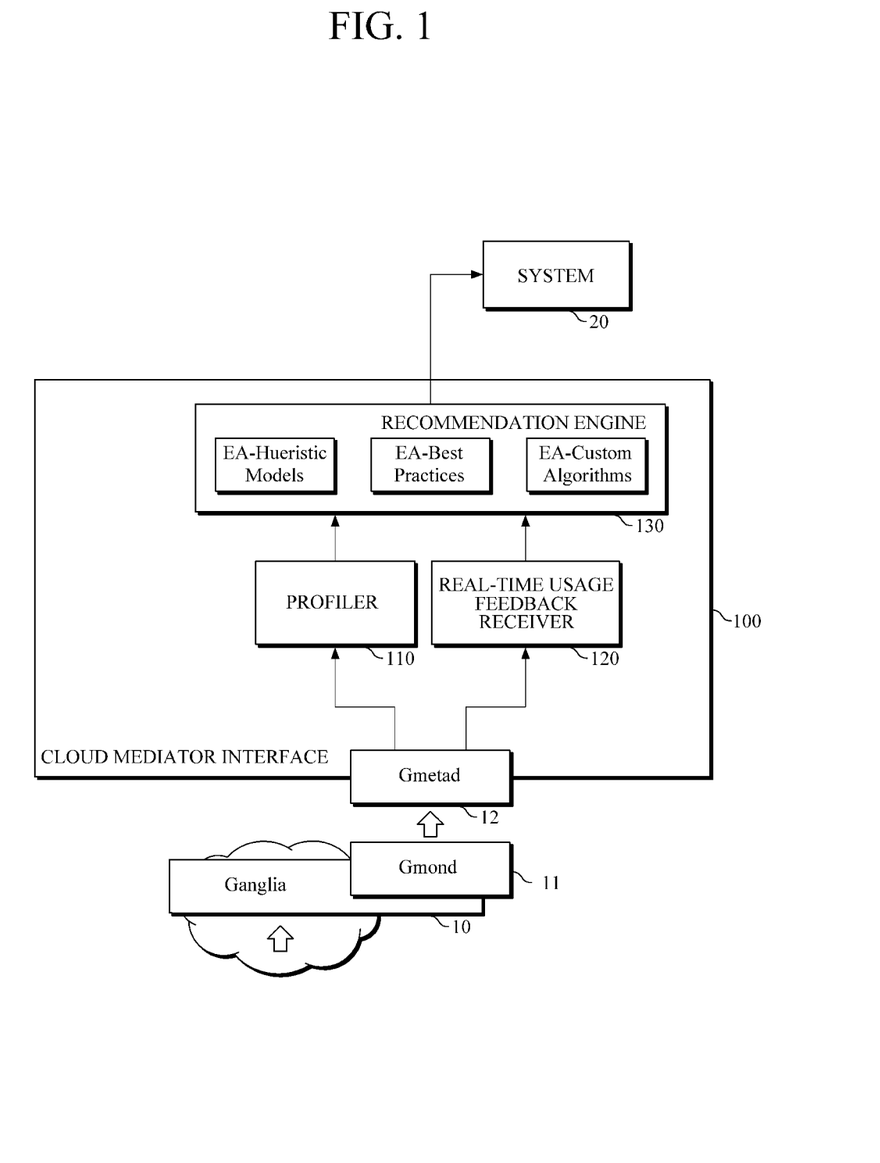
FIG. 1 is a diagram illustrating an example of a profiling-based energy-aware recommendation system for a cloud platform according to an exemplary embodiment.

FIG. 1 is a diagram illustrating an example of a profiling-based energy-aware recommendation system for a cloud platform according to an exemplary embodiment.

FIG. 1 illustrates a multi-core cloud platform that uses Ganglia 10 for usage-based data collection. Here, Ganglia 10 is a tool for monitoring clusters and developed by UC Berkeley. However, Ganglia 10 is just one example, and exemplary embodiments are not limited thereto. That is, other various tools with a function of monitoring the clusters are available.

A Ganglia Monitoring Daemon (gmond) 11 is installed on the node that could be monitored, so as to inform its state by sending a multicast message to the gmond daemon of another host, and also inform the system state of another node different from itself in a form of Extensible Markup Language (XML) by collecting the information of another host. Here, one gmond 11 is illustrated for convenience of description but gmond daemons may be installed on a plurality of nodes, respectively. Also, since the gmond transmits host information only to the host on the same network, the gmond does not multicast on a wide area network (WAN).

A Ganglia Meta Daemon (gmetad) 12 stores, in round-robin database (RRD), host information collected from a plurality of gmond daemons on a WAN. The gmetad 12 needs to operate only on a web server where a Ganglia web interface is to be installed.

A cloud mediator interface 100 performs the role of the bridge between a system 20 and a Ganglia 10. That is, the cloud mediator interface 100 communicates with the gmond 11, being arranged on each of the cloud nodes through the gmetad 12. When the cloud nodes operate, the cloud mediator interface 100 collects and analyzes a vital sign and cloud resource usage data for node profiling, and provides energy usage recommendation information for the provisioning to a system 20. To that end, the cloud mediator interface 100 specifically includes a profiler 110, a real-time use feedback receiver 120, and a recommendation engine 130.

The profiler 110 acquires usage data over predetermined intervals of time from each of the nodes and profiles the individual nodes, which will be described specifically with reference to FIG. 2 below.

Figure 2:
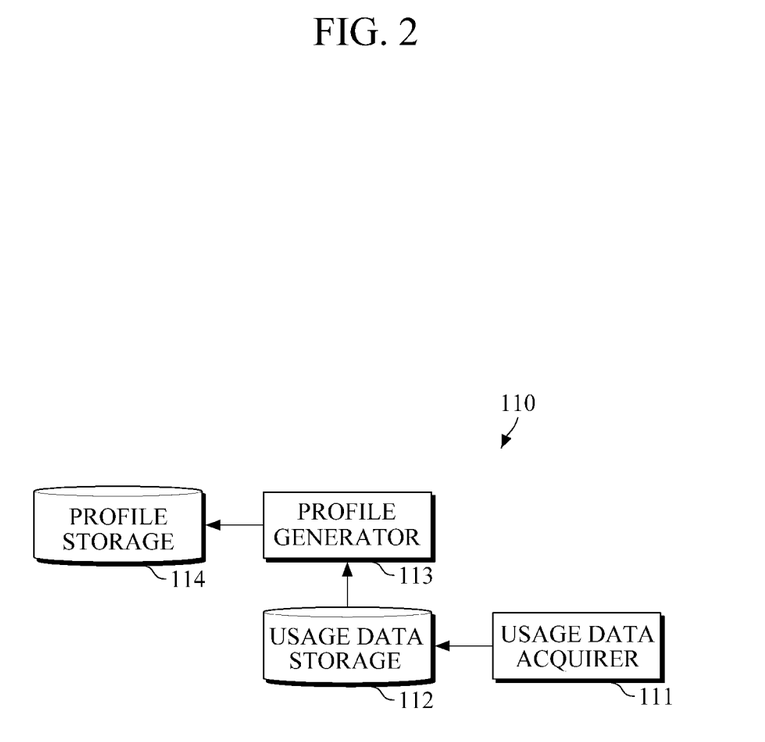
FIG. 2 is a detailed diagram illustrating a profiler according to an exemplary embodiment.

FIG. 2 is a detailed diagram illustrating an example of a profiler.

Referring to FIG. 2, a profiler 110 specifically includes a usage data acquirer 111, usage data storage 112, a profile generator 113, and profile storage 114.

The usage data acquirer 111 collects the cloud usage data of each node through the ganglia 10. First, it is important to create proper data by using the use logs of the cloud nodes over predetermined intervals of time. Such data includes information regarding CPU usage, network input/output (I/O), disk I/O, and memory utilization. The efficiency of available energy, which can be used during operation time to efficiently acquire and recommend a usage pattern, may be obtained from such information.

For usage U and load interval L, the usage at predefined intervals of time may be defined as shown in Equation 1 below.

$$U_L \leftarrow \{cpu, diskIO, networkIO, memory\} \quad \text{[Equation 1]}$$

Such usage $U_L$ may be collected for various usage scenarios. For example, in the case of cloud being used as a compute cluster, possible scenarios are distributed video encoding or scientific application, and for several load intervals.

Each node's usage data, which is acquired by the usage data acquirer 111, is stored in the usage data storage 112. Here, the usage data storage 112 is configured in one physically, which is, however, just one example and is not limited thereto. That is, the usage data storage 112 may be distributed. Here, since the amount of the usage data may be huge according to the size of cloud infrastructure, the usage data may be stored in Hadoop Distributed File System (HDFS) according to the exemplary embodiment.

The profile generator 113 generates an efficient energy usage profile by using the data stored in the usage data storage 112. Usage logs are evaluated depending on the profiling mechanism of an exemplary embodiment. Such a profiling mechanism works solely or cumulatively so as to generate an advanced node profile.

Specifically, the total usage $U_T$ for cloud nodes over several load intervals may be calculated as shown in Equation 2 below.

$$LoadInterval = \{10, 20, 30, \ldots 100\} \quad \text{[Equation 2]}$$

$$U_T \leftarrow \sum_{i=1}^{time} U_{LoadInterval}$$

$$P \leftarrow f(U_T)$$

That is, the usage patterns are extracted from the total usage $U_T$ that is calculated from Equation 2, and is stored as the usage profile. The f(x) is used to extract information on profiling P with regard to the total usage $U_S$ for each scenario. Here, the function f(x) is used to match the real-time values of $U_L$ parameters to the profile parameters stored in the usage patterns, and to profiles. In the case of a possible match, the profile is returned. Such a match is based on a threshold, instead of the exact match.

After profiling, the profile generator 113 couples the most efficient profile with the usage scenario and evaluation features, such as the utilization of CPU and possible energy efficiency. Also, the profile generator 113 records the hardware specification tagged on each of the profiles, wherein the hard specification includes the CPU type, its available cores, available memory, and hypervisor type. Thus, this feature enables the system to avoid profiling nodes with similar hardware specification, saving evaluation time. In other words, in the case in which a new node, which is a node with the similar specification to the already profiled node, is added to the cloud, this addition may be directly performed not passing through the additional profiling process.

In the profile storage 114, the most energy-efficient usage profile is stored. Here, usage profiles may be stored in the form that is classified according to application, Virtual Machine, node attributes, etc.

Meanwhile, referring to FIG. 1 again, a real-time usage feedback receiver 120 receives real-time usage data from gmetad 12.

The recommendation engine 130 in FIG. 1 maps the real-time usage data, received from the real-time usage feedback receiver 120, to profiles generated by the profile generator 110. In the case of the exact match, energy efficiency scheme for particular usage is returned as an intermediate recommendation value as shown in Equation 3 below.

Usage$^t$←Gmetad($t$)

Profile←$h$(Usage$^t$∩$P$)

CreateRecommendation(Profile) [Equation 3]

The recommendation engine 130 includes energy-aware (EA)-heuristic models, EA-best practices, and EA-custom algorithms, one of which is used so as to compare the profile information from the profiler 110 and the information from the real-time usage feedback receiver 130 and then generate the recommendation values. These recommendation values from the recommendation engine 130 are added to the above-mentioned intermediate recommendation values, and a final recommendation value is forwarded to a system 20 in FIG. 1.

Also, the profiler 110 and the real-time usage feedback receiver 120 are required to calculate the power of task, which will be described with reference to FIG. 3 below.

Figure 3:
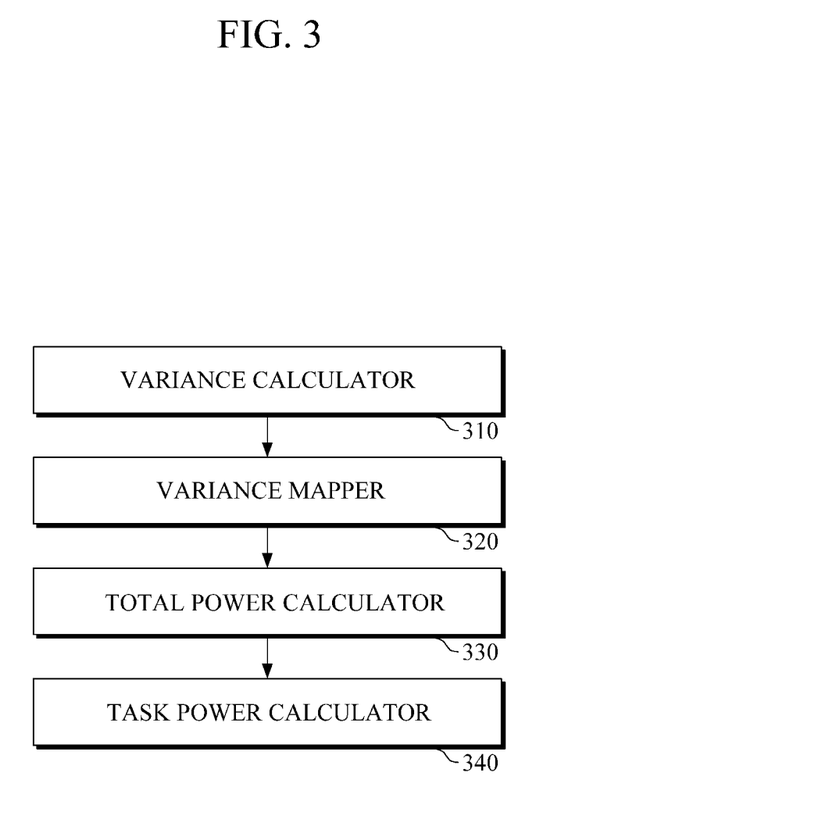
FIG. 3 is a detailed diagram for power calculation according to an exemplary embodiment.

FIG. 3 is a detailed diagram for power calculation according to an exemplary embodiment.

Referring to FIG. 3, a variance calculator 310, a variance mapper 320, a total power calculator 330, and a task power calculator 340 are configured for power calculation.

The variance calculator 310 calculates variance Δv between the nodes of stress and idle levels by using Equation 3 as shown below. Such a variance provides the scale on which the power of task will fluctuate.

$$\Delta_v U_{stress} - U_{idle}$$ [Equation 4]

The power usage of stress $U_{Stress}$ and idle $U_{idle}$ level in Equation 4 above may be provided by CPU vendors in their specification.

The variance mapper 320 maps the actual usage to a variance scale so as to calculate load to power ratio (LPR$_{Node}$) through Equation 5 below.

$$LPR_{Node} = \left(\frac{\Delta_v \times U_{cpu}}{100}\right) + U_{Idle}$$ [Equation 5]

Accordingly, the actually consumed power usage may be obtained. However, power usage of used hardware components needs to be added to calculate the total power of actual usage (P$_{Total}$).

The total power calculator 340 calculates the total power by adding the power, consumed at the hardware components, to the value calculated from Equation 5 shown above. Here, the hardware components may include memory, storage drives, fans, power supply units, etc. Power usage of these components is provided in CPU specification.

That is, the total power calculator 340 calculates the total power of actual usage (P$_{Total}$) by adding the usage power of the hardware components to the load to power ratio LPR$_{Node}$, as shown in Equation 6 below.

$$P_{int.} = \left(\frac{LPR_{Node} + P_{mem} + P_{Hdd} + P_{Fan}}{1000}\right)$$ [Equation 6]

$$P_{Total} = P_{Int.} + PSU_\varepsilon$$

At last, the task power calculator 340 calculates the consumed power of the task by multiplying the amount of running time for the task by the total power of task, which has been acquired by the total power calculator 330.

$$P_{Task} = P_{Total} \times Time_{hrs}$$ [Equation 7]

Figure 4:
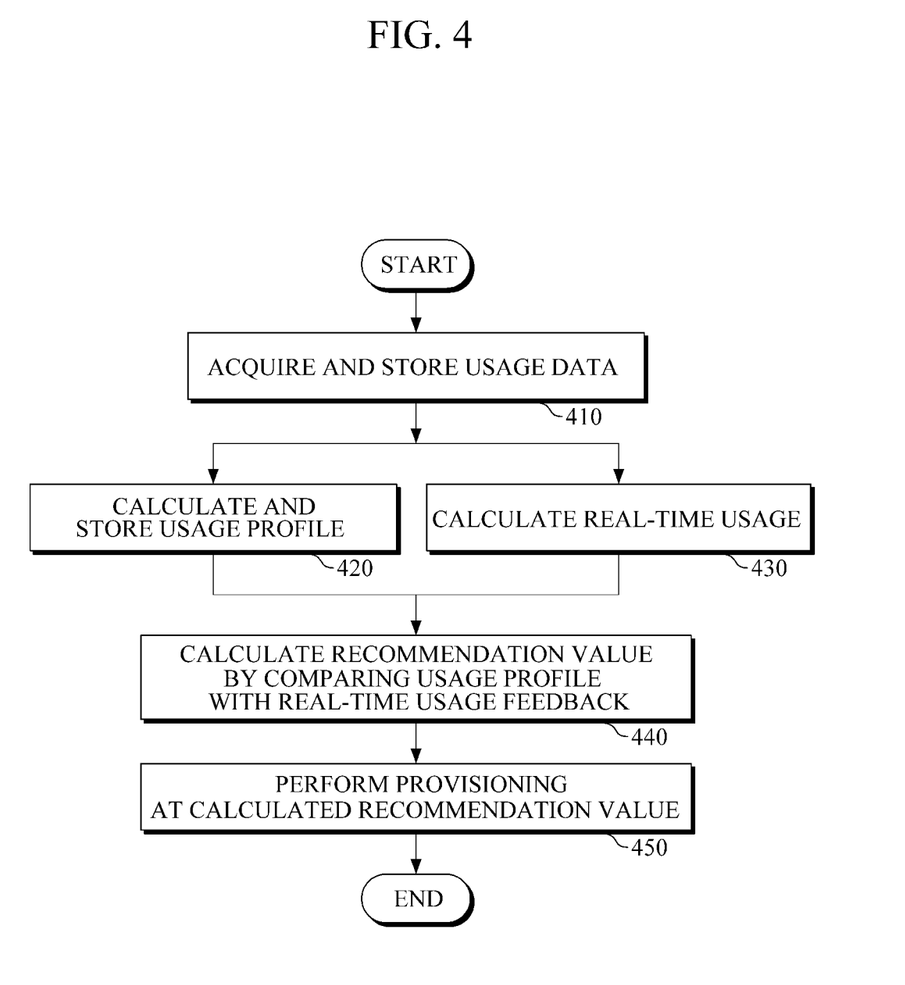
FIG. 4 is a flowchart illustrating a profiling-based energy-aware recommendation method for a cloud platform according to an exemplary embodiment.

FIG. 4 is a flowchart illustrating a profiling-based energy-aware recommendation method for a cloud platform according to an exemplary embodiment.

Referring to FIG. 4, a cloud mediator interface 100 (hereinafter referred to as 'interface') communicates with the gmond 11 as being arranged on each of the cloud nodes through the gmetad 12, and when the cloud nodes operate, collects an important sign and cloud resource usage data for node profiling in 410. That is, it is important to create proper data by using the use logs of the cloud nodes over predetermined intervals of time. Such data includes information regarding CPU usage, network input/output (I/O), disk I/O, and memory utilization. The efficiency of available energy, which can be used during operation time to efficiently acquire and recommend a usage pattern, may be obtained from such information.

The interface 100 acquires usage data over predetermined intervals of time from each of the nodes, and generates and stores an efficient energy usage profile for each of the nodes in 420. That is, usage logs are evaluated depending on the profiling mechanism of an exemplary embodiment. Such a profiling mechanism works solely or cumulatively so as to generate an advanced node profile. After profiling, the most efficient profile is coupled with the usage scenario and evaluation features, such as the utilization of CPU and possible energy efficiency. Also, the hardware specification is recorded being tagged on each of the profiles, wherein the hard specification includes the CPU type, its available cores, available memory, and hypervisor type. Thus, this feature enables the system to avoid profiling nodes with similar hardware specification, saving evaluation time. In other words, in the case in which a new node, which is a node with the similar specification to the already profiled node, is added to the cloud, this addition may be directly performed not passing through the additional profiling process. Also, in terms of storing the profiles, the most energy-efficient usage profile is stored. Here, usage profiles may be stored in the form that is classified according to application, Virtual Machine, node attributes, etc.

The interface 100 receives a feedback of real-time usage data from gmetad 12 and calculates the real-time usage power in 440.

The interface 100 compares the real-time usage data with the generated profiles and acquires the recommendation values in 440. That is, one of energy-aware (EA)-heuristic models, EA-best practices, and EA-custom algorithms is used so as to compare the real-time usage data with the generated profiles and then generate the recommendation values. These recommendation values are added to the above-mentioned intermediate recommendation values, and a final recommendation value is forwarded to a system 20 in FIG. 1.

Provisioning is performed at the calculated recommendation value in 450.

The power of task is required to be calculated in 420 and 430, which will be described with reference to FIG. 5.

Figure 5:
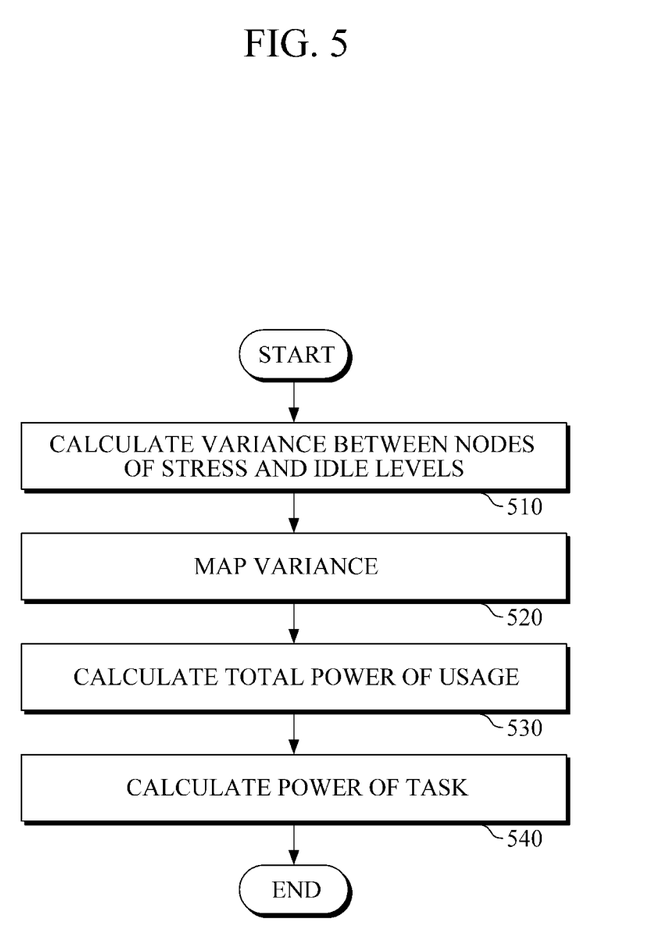
FIG. 5 is a flowchart for power calculation according to an exemplary embodiment.

FIG. 5 is a flowchart for power calculation according to an exemplary embodiment.

Referring to FIG. 5, variance Δv between the nodes of stress and idle levels is calculated (with reference to Equation 4 mentioned above) in 510.

The actual usage is mapped to a variance scale so as to calculate load to power ratio ($LPR_{Node}$) (with reference to Equation 5 mentioned above) in 520.

The total power is calculated by adding up the powers consumed at hardware components (with reference to Equation 6 mentioned above) in 530. Here, the hardware components may include memory, storage drives, fans, power supply units, etc. Power usage of these components is provided in CPU specification.

The consumed power of the task is calculated by multiplying the amount of running time for the task by the total power of task (with reference to FIG. 7 mentioned above) in 540.

According to exemplary embodiments of the present invention, virtual machines may be provisioned to reduce the possibilities of idle systems so that an ideal energy efficient cloud platform may be configured A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for provisioning a cloud platform, performed by a cloud mediator interface which is arranged on each cloud node and performs a role of a bridge between a cloud system and a Ganglia, wherein each cloud node comprises a multi core CPU, one or more network I/O units, one or more disk I/O units, and one or more non-transitory memories, the method comprising:
   collecting usage data of a cloud node over intervals of time;
   generating and storing an energy usage profile for each cloud node by using the collected usage data;
   acquiring real-time usage data from the cloud node;
   comparing the real-time usage data with the generated energy usage profile so as to calculate a recommendation value; and
   provisioning the cloud platform based on the recommendation value,
   wherein each of the storing and the acquiring comprises calculating variance between stress and idle levels of nodes, and
   wherein when a new node determined to have a similar specification to any profiled node is added to a cloud, the generating comprises immediately adding the new node without an additional profiling process, for avoiding profiling nodes with similar hardware specifications to save evaluation time.

2. The method of claim 1, wherein the usage data includes any one or any combination of any two or more of CPU usage, network input/output (I/O), disk I/O, and usage memory data.

3. The method of claim 1, wherein the energy usage profile is tagged with information comprising any one or any combination of any two or more of a CPU type, available cores, available memory, and hypervisor type.

4. The method of claim 3, wherein each of the storing and the acquiring further comprises
   mapping an actual usage to a variance scale so as to calculate load to power ratio,
   calculating a total power by adding power consumed at hardware components, and
   calculating a consumed power of a task by multiplying an amount of running time for the task by a total power of the task.

5. The method of claim 4, wherein the hardware components comprise any one or any combination of any two or more of a memory, storage drives, fans, power supply units, and power usage of the hardware components provided in a CPU specification.

6. The method of claim 1, wherein the generating and storing of the energy usage profile comprises storing a most energy-efficient usage profile.

7. The method of claim 1, wherein the generating and storing of the energy usage profile comprises storing usage profiles in a form that is classified according to an application, a virtual machine, or node attributes.

8. The method of claim 1, wherein the generating and storing of the energy usage profile comprises extracting usage patterns from a total usage.

9. The method of claim 8, wherein the generating and storing of the energy usage profile further comprises matching real-time values of usage parameters to profile parameters stored in the usage patterns based on a threshold.

10. The method of claim 9, wherein
    the generating and storing of the energy usage profile further comprises matching the real-time values of the usage parameters to profiles, and
    in response to detecting a possible match, a profile among the profiles is returned.

11. The method of claim 9, wherein the generating and storing of the energy usage profile further comprises returning an energy efficiency scheme for a particular usage as an intermediate recommendation value, in response to detecting an exact match.

12. The method of claim 11, wherein the recommendation value is calculated by adding a plurality of intermediate recommendation values, including the intermediate recommendation value, to a plurality of recommendation values.

13. The method of claim 1, further comprising directly adding a another new node by limiting a profiling process of the another new node, in response to determining that a hardware specification of the another new node is similar to a hardware specification of the cloud node.

14. An apparatus for provisioning a cloud platform, wherein the apparatus is arranged on each cloud node and performs a role of a bridge between a cloud system and a Ganglia, and wherein each cloud node comprises a multi core CPU, one or more network I/O units, one or more disk I/O units, and one or more non-transitory memories, the apparatus comprising:
    a profiler configured to collect usage data of a cloud node over intervals of time, and generate and store an energy usage profile for each cloud node by using the collected usage data;
    a real-time usage feedback receiver configured to acquire real-time usage data from the cloud node; and
    a recommendation engine configured to compare the real-time usage data with the generated energy usage profile so as to calculate a recommendation value, wherein the cloud platform is provisioned based on the recommendation value, wherein either one or both of the profiler and the real-time usage feedback receiver is configured to calculate variance between stress and idle levels of nodes, and wherein when a new node determined to have a similar specification to any profiled node is added to the cloud, the profiler immediately adds the new node without an additional profiling process for avoiding profiling nodes with similar hardware specifications to save evaluation time.

15. The apparatus of claim 14, wherein the usage data includes any one or any combination of any two or more of CPU usage, network input/output (I/O), disk I/O, and usage memory data.

16. The apparatus of claim 14, wherein the energy usage profile is tagged with information comprising any one or any combination of any two or more of a CPU type, available cores, available memory, and hypervisor type.

17. The apparatus of claim 16, wherein each of the profiler and the real-time usage feedback receiver is configured to map an actual usage to a variance scale so as to calculate load to power ratio, calculate a total power by adding power consumed at hardware components, and calculate a consumed power of a task by multiplying an amount of running time for the task by a total power of the task.

18. The apparatus of claim 14, wherein the profiler is further configured to store a most energy-efficient usage profile.

19. The apparatus of claim 14, wherein the profiler is further configured to store usage profiles in a form that is classified according to an application, a virtual machine, or node attributes.

\* \* \* \* \*